United States Patent
Benes et al.

(10) Patent No.: US 6,199,740 B1
(45) Date of Patent: Mar. 13, 2001

(54) PNEUMATIC FASTENER INSERTER AND HOPPER FOR SAME

(75) Inventors: David J. Benes; Kelly E. Benes; David C. Mueller, all of Fremont, NE (US)

(73) Assignee: Waitt/Fremont Machine, L.L.C., Fremont, NE (US)

( * ) Notice: Subject to any disclaimer, the term of this patent is extended or adjusted under 35 U.S.C. 154(b) by 0 days.

(21) Appl. No.: 09/376,249

(22) Filed: Aug. 18, 1999

(51) Int. Cl.[7] ................................................ B65G 29/02
(52) U.S. Cl. .......................... 227/112; 227/119; 227/137; 221/68; 221/296
(58) Field of Search ...................................... 227/112, 117, 227/116, 137, 139, 119; 221/268, 68, 296, 234

(56) References Cited

U.S. PATENT DOCUMENTS

| | | | |
|---|---|---|---|
| 3,946,926 | * 3/1976 | Willis | 227/112 |
| 5,400,942 | * 3/1995 | Gast et al. | 227/112 |
| 5,480,087 | * 1/1996 | Young et al. | 227/119 |
| 5,603,442 | * 2/1997 | Schmidt et al. | 227/137 |
| 6,079,604 | * 6/2000 | Banducci et al. | 227/112 |

* cited by examiner

*Primary Examiner*—Scott A. Smith
(74) *Attorney, Agent, or Firm*—Zarley, McKee, Thomte, Voorhees & Sease; Dennis L. Thomte

(57) ABSTRACT

A pneumatic fastener inserter and hopper for the same is disclosed for use in inserting fasteners into material being secured. The hopper comprises a rotatable drum which tumbles the fasteners therein into position so that the shanks thereof protrude outwardly between spaced-apart bars. The fasteners are discharged from a discharge opening formed in the hopper and are delivered to a magazine which is in communication with an entrapment apparatus which feeds the fasteners to a feed tube under pressure. The air pressure in the feed tube delivers the individual fasteners to the inserter with the fastener being positioned between pivotally movable head fingers which open to receive the fastener to position the same for subsequent insertion and which pivot to enable the fastener to be driven outwardly therefrom by a piston rod so that the fastener is driven into and through the material being secured.

13 Claims, 18 Drawing Sheets

PNEUMATIC FASTENER INSERTER AND HOPPER FOR SAME

BACKGROUND OF THE INVENTION

1. Field of the Invention

This invention relates to a fastener inserter and more particularly to a pneumatically powered fastener inserter which includes a feed hopper adapted to contain a plurality of fasteners. The feed hopper supplies fasteners to the inserter which inserts individual fasteners into the material or object being secured.

2. Description of the Related Art

T-shaped fasteners normally comprise an elongated shank having a pointed portion at one end thereof and an enlarged head portion at the other end thereof. In most cases, the fastener is provided with a retention means on the shank which resists the fastener being pulled from the material or object being secured. One type of such fastener is commonly referred to as a "Christmas tree" fastener and it includes a plurality of spaced-apart retention members in the form of ribs extending outwardly from the shank thereof. During insertion, the ribs on the shank normally deflect inwardly towards the shank, but the ribs prevent the fastener from being pulled from the material or object once the fastener has been inserted. In many cases, the ribs are swept back to facilitate the insertion thereof.

In the past, it is believed that the most common method of installing the fasteners in the material being secured was to initially manually force the fastener into position and then use some type of pneumatic hammer or the like to drive the fastener into place. The requirement that the fastener be initially manually placed into position is obviously time-consuming and increases the time necessary to insert the fastener.

SUMMARY OF THE INVENTION

A pneumatic fastener inserter for inserting fasteners, of the type having a shank and an enlarged head, into the material being secured comprising a hopper rotatably mounted on a support in an inclined position with respect to horizontal. The hopper includes an inclined, stationary, closed lower end with the closed lower end including a base plate and an upwardly extending flange at the periphery thereof. A first discharge slot is formed in the flange and a second discharge slot is formed in the base plate which are adapted to permit the discharge of fasteners from the hopper. The hopper also includes a rotatable drive shaft which rotatably extends upwardly and outwardly through the inclined base plate with first and second bar supports being secured to the drive shaft for rotation therewith. A plurality of flat bars are mounted on the first and second bar supports with the bars being spaced-apart from one another to define a gap between adjacent bars. The lower ends of the bars are partially received by the flange which extends from the base plate. The fasteners are placed in the interior of the hopper in a random bulk fashion with the hopper being rotated by a motor or the like as required. As the hopper rotates, some of the fasteners in the hopper position themselves so that the shanks thereof extend outwardly from the hopper between the bars. Eventually, the fasteners move, by gravity, to the lower ends of the bars upon which they are supported. When a protruding fastener is rotated into alignment with the first discharge slot in the base plate and the second discharge slot in the flange, the aligned fastener falls from the interior of the hopper into a pair of horizontally spaced and vertically disposed magazine members so that the fasteners are stacked one upon the other therein. The hopper is only rotated when the uppermost fastener in the magazine members has been lowered to a predetermined position. The hopper is then rotated to supply additional fasteners to the magazine members with the rotation of the hopper being discontinued when the stacked fasteners in the magazine members have reached a predetermined level. The lower ends of the magazine members are in communication with a conventional entrapment apparatus which supplies one fastener at a time, upon demand, to an elongated flexible tube or hose which extends to the pneumatic inserter. A fastener is delivered to the inserter by way of air pressure and passes downwardly therethrough to a position between first, second and third head fingers which are pivotally mounted in a head adapter selectively secured to the lower end of the inserter. The inserter is manipulated so that the protruding pointed end of the fastener is placed into position with the trigger of the inserter then being activated which causes an air driven piston rod to strike the head of the fastener to drive the fastener downwardly (outwardly) from the pivotal head fingers which pivot outwardly against the resiliency of an O-ring extending therearound. When the fastener has been inserted into the material or object being secured, the cycle may be repeated.

It is therefore a principal object of the invention to provide a pneumatic fastener inserter and hopper for the same.

It is a further object of the invention to provide a pneumatic fastener inserter for inserting fasteners into material being secured.

Still another object of the invention is to provide a rotatable fastener hopper which permits fasteners to be placed therein in a bulk and random fashion and which includes means for supplying the individual fasteners to a pneumatic fastener inserter.

Still another object of the invention is to provide a pneumatic fastener inserter which may be easily modified to accommodate various types and sizes of fasteners.

Still another object of the invention is to provide a pneumatic fastener inserter which eliminates the need for manually placing the fastener into position prior to it being driven into the material being secured.

Still another object of the invention is to provide a pneumatic fastener inserter which is convenient to use.

Still another object of the invention is to provide a pneumatic fastener inserter which greatly decreases the amount of time required to insert fasteners into material or objects being secured.

These and other objects of the invention will be apparent to those skilled in the art.

DESCRIPTION OF THE PREFERRED EMBODIMENT

Figure 1:
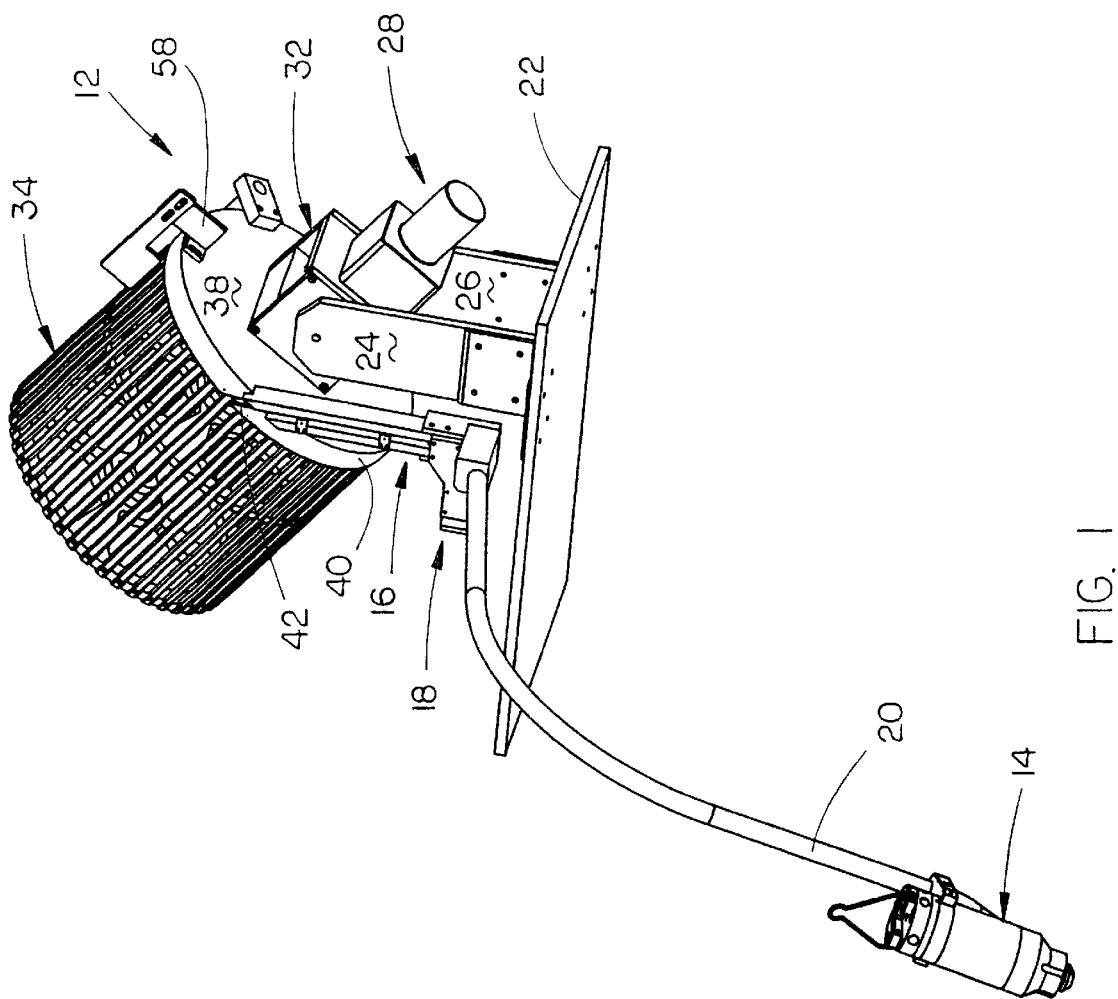
FIG. 1 is a rear perspective view of the system of this invention.
Figure 2:
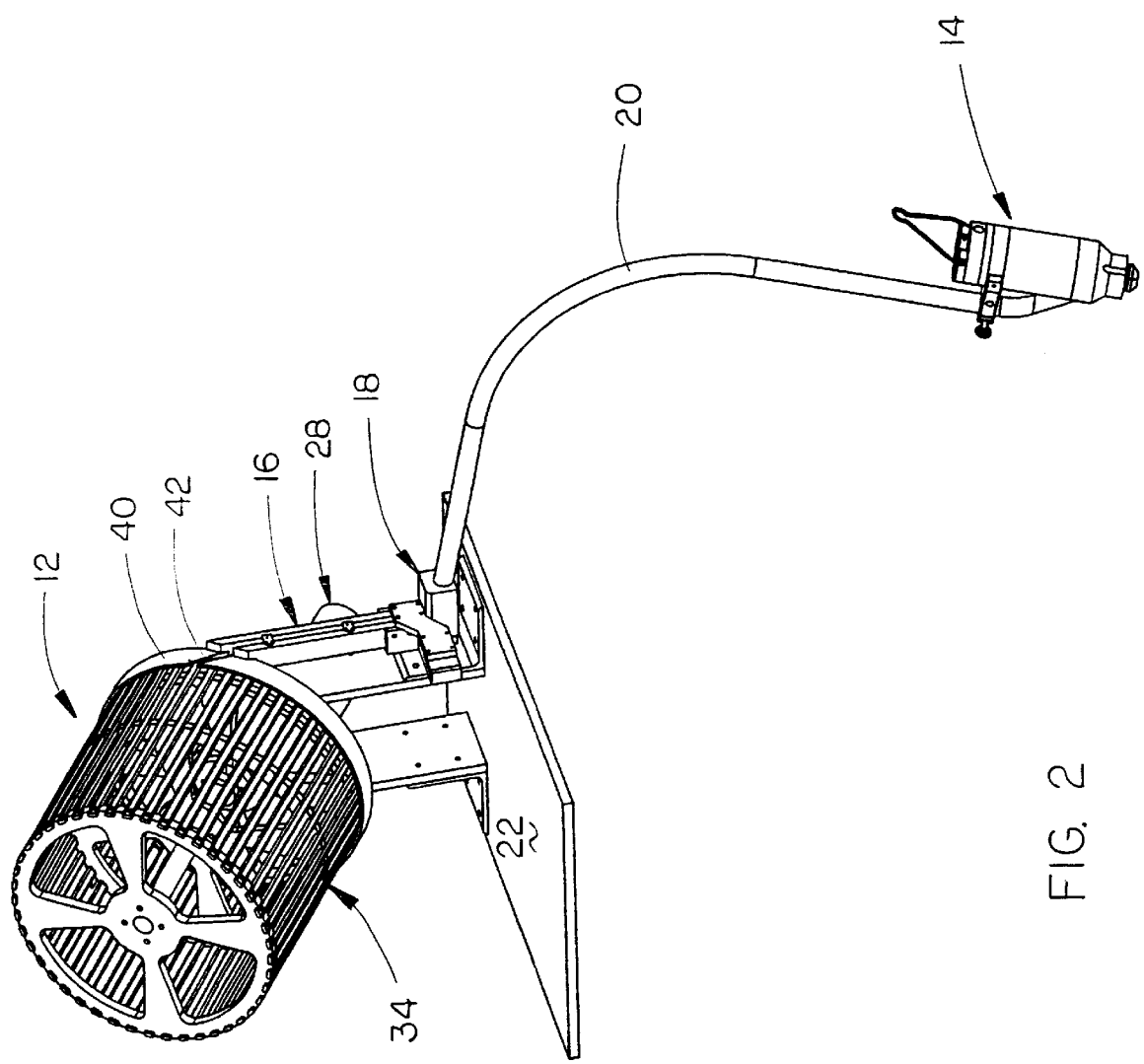
FIG. 2 is a front perspective view of the system of this invention.
Figure 3:
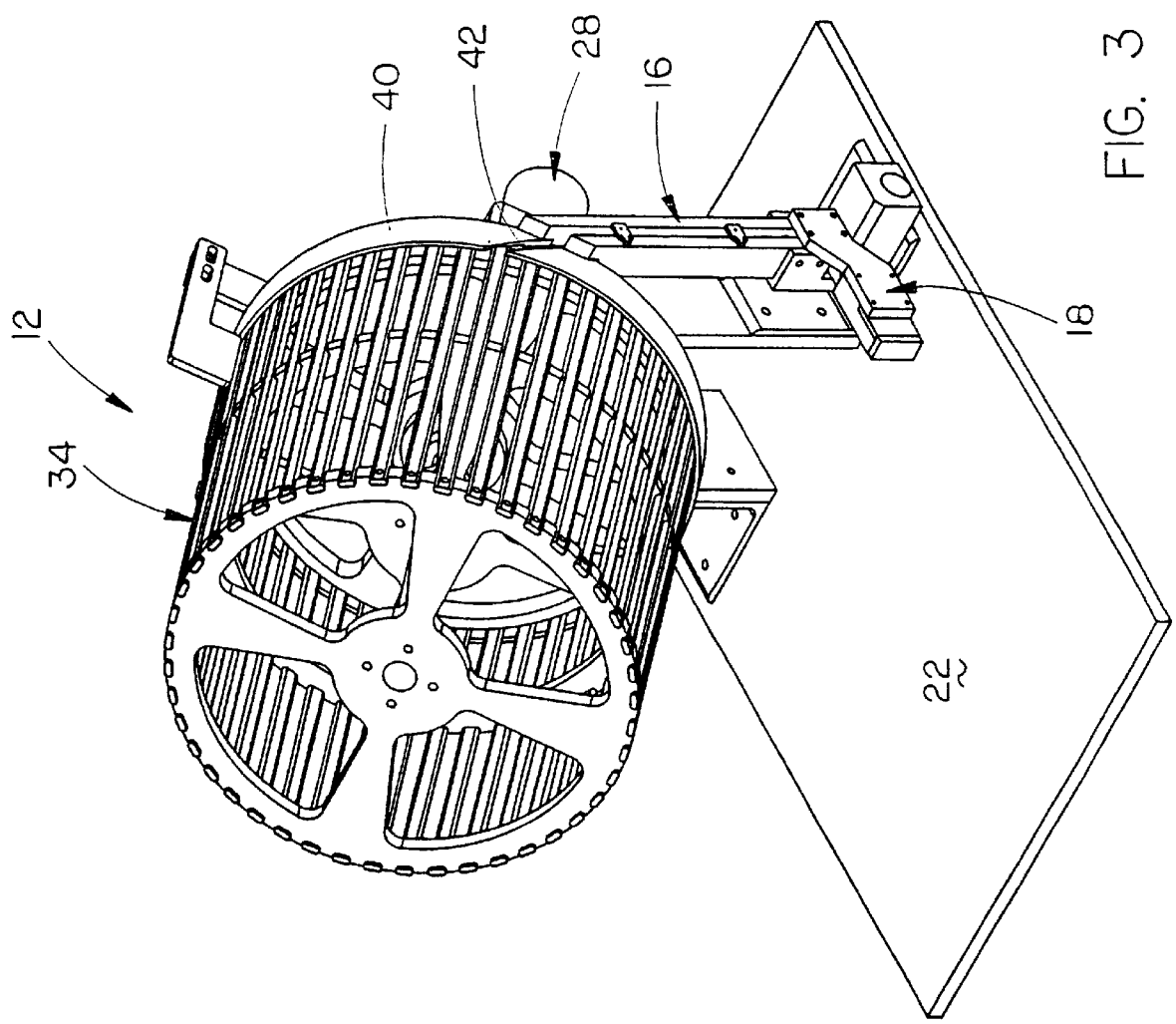
FIG. 3 is a front perspective view of the hopper of the invention.
Figure 4:
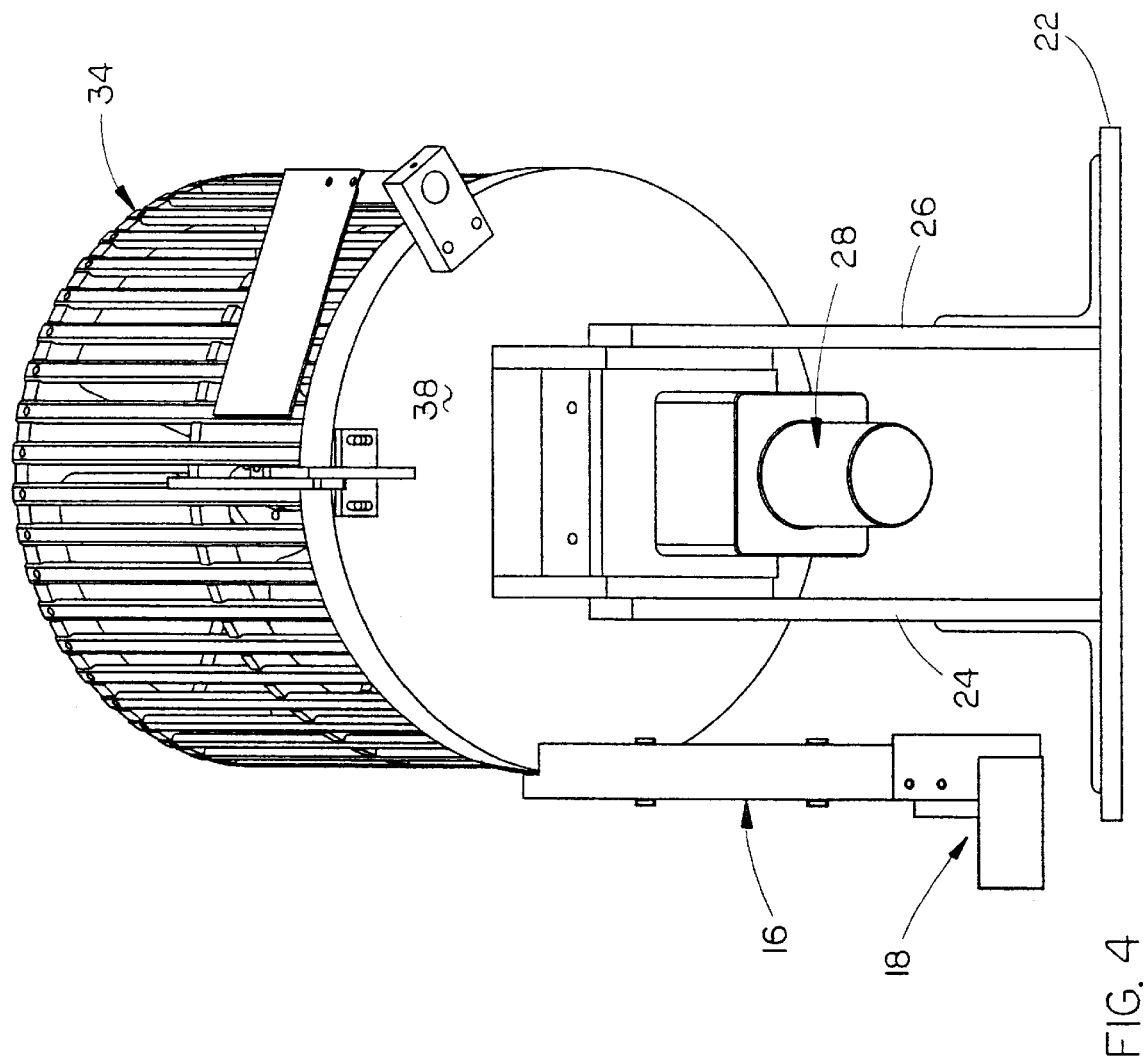
FIG. 4 is a rear view of the hopper.
Figure 5:
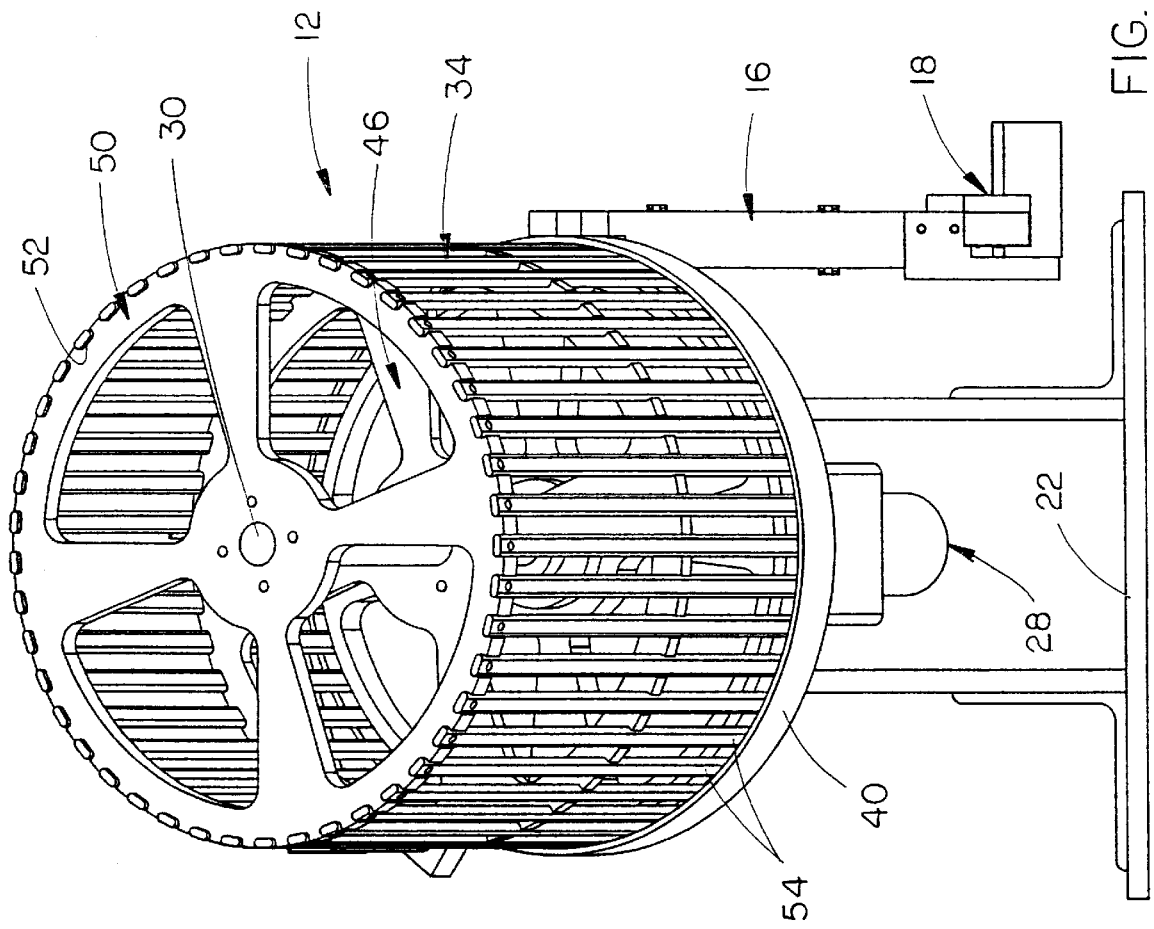
FIG. 5 is a front view of the hopper.
Figure 6:
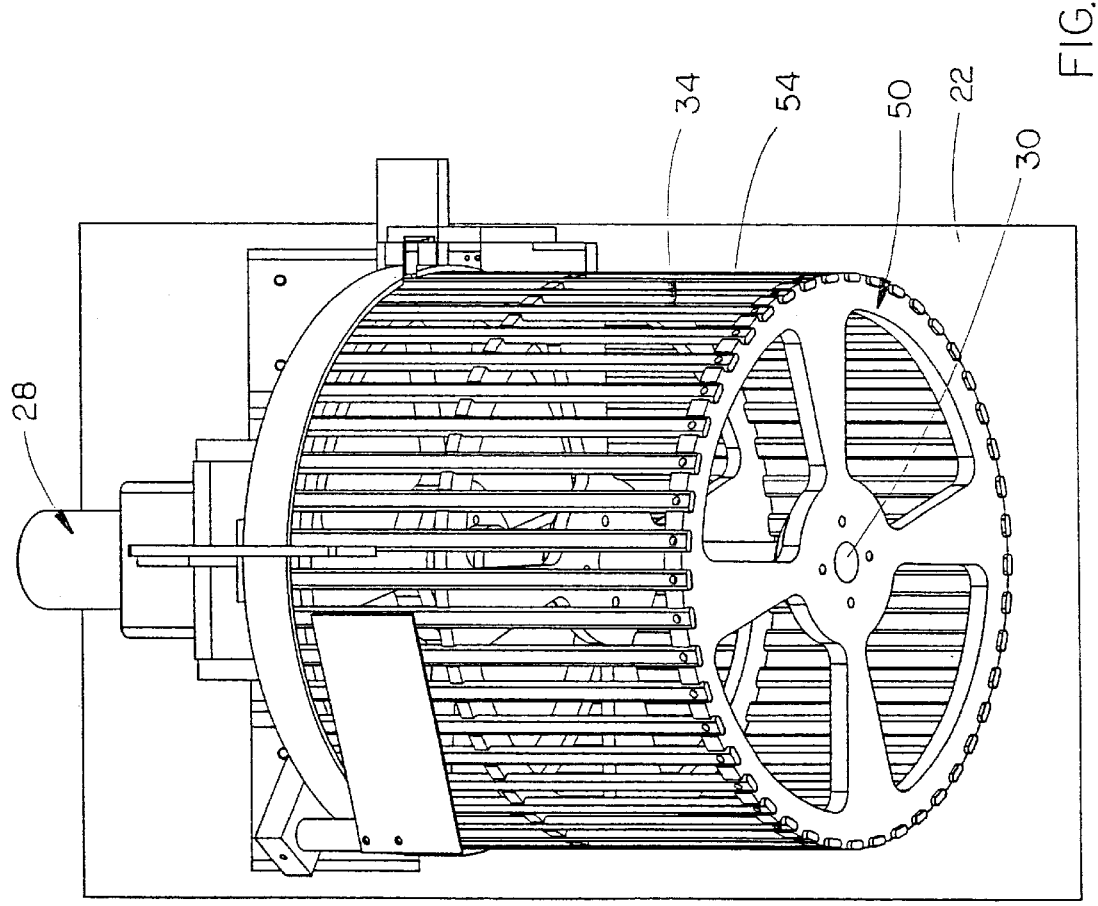
FIG. 6 is a top view of the hopper.
Figure 7:
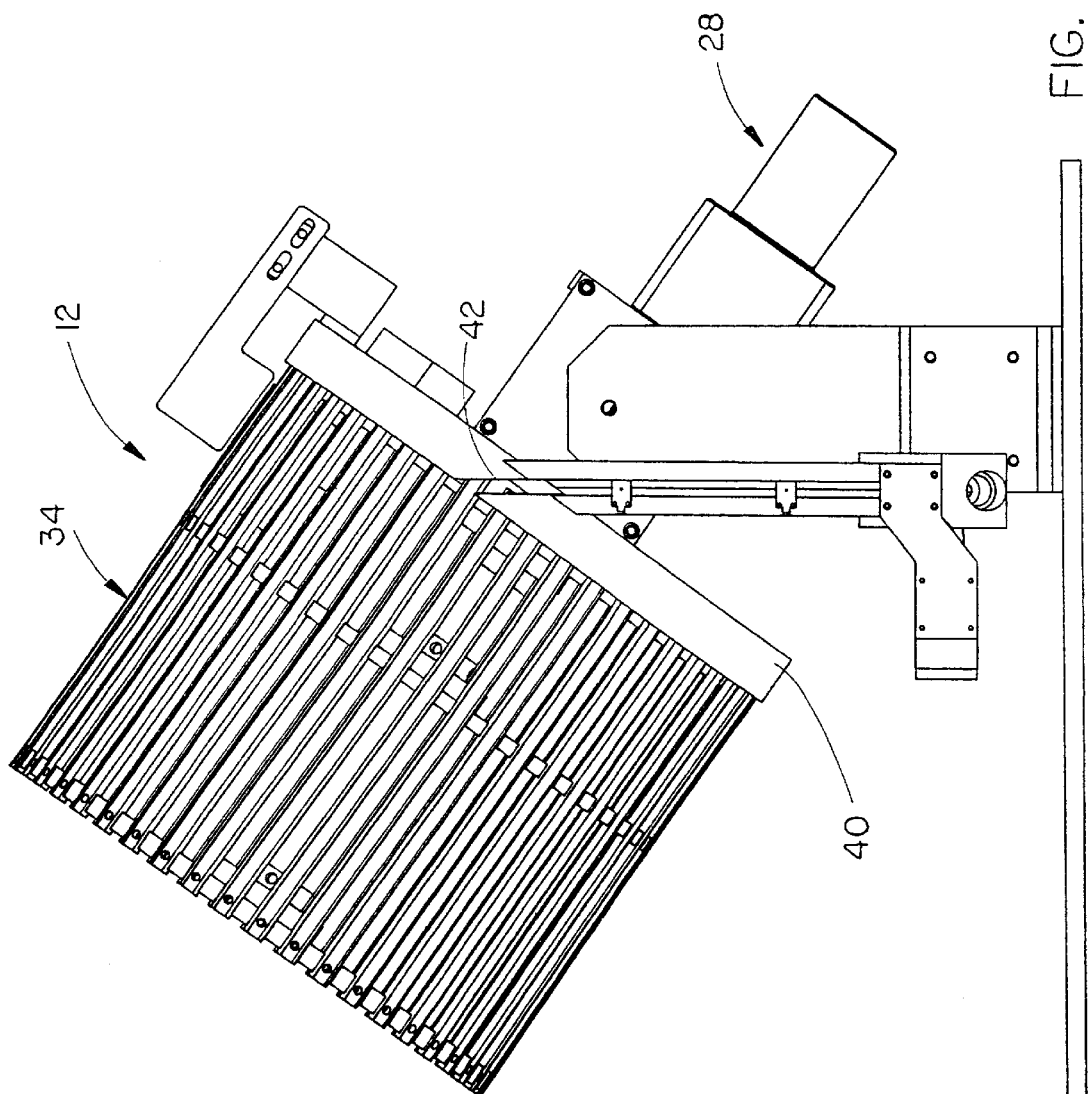
FIG. 7 is a side view of the hopper.
Figure 8:
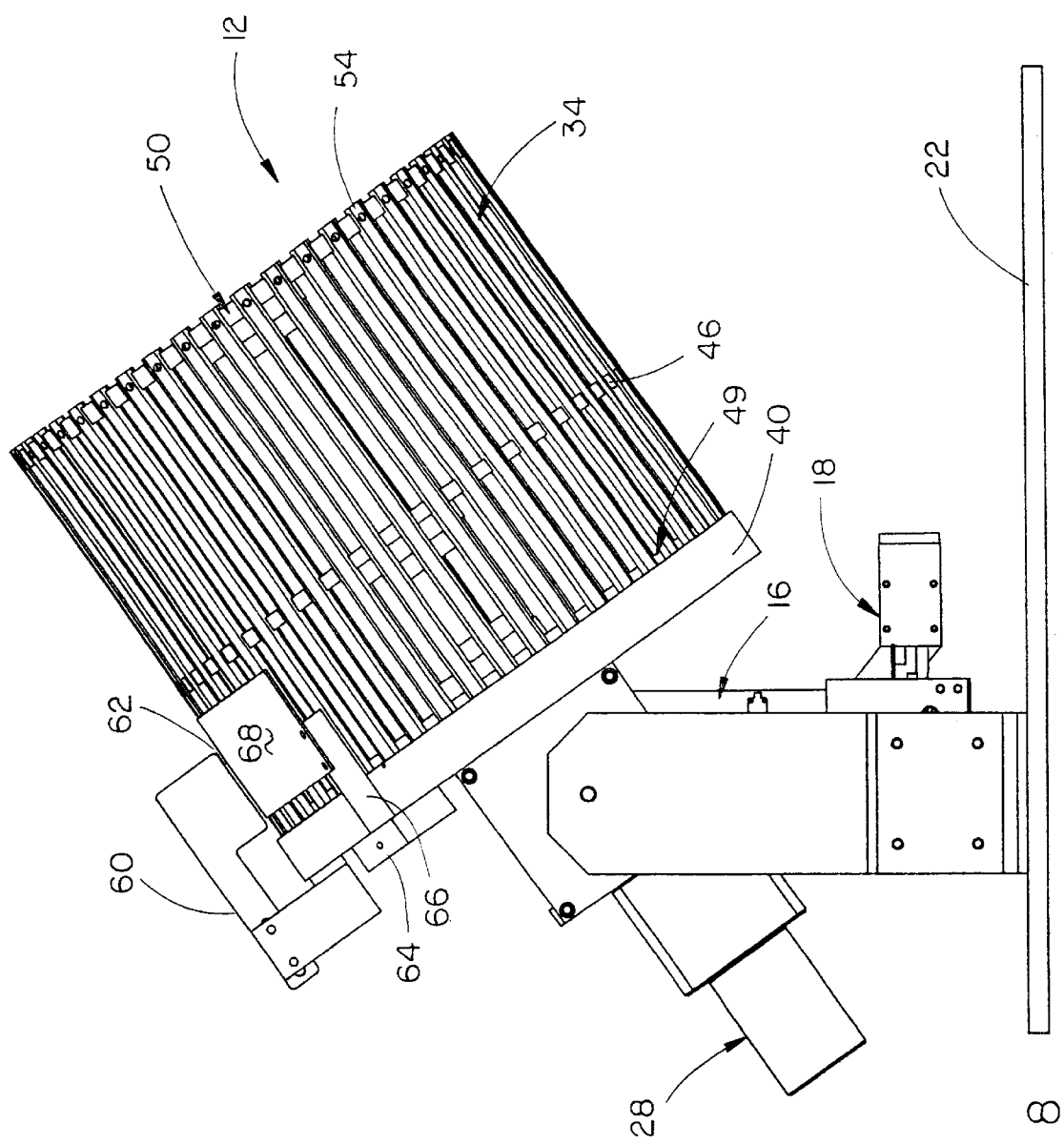
FIG. 8 is a side view of the hopper opposite to that shown in FIG. 7.

The fastener inserter and hopper system of this invention is referred to generally by the reference numeral 10 and includes a hopper assembly 12, a pneumatic inserter 14, inserter magazine 16, entrapment assembly 18, and tube 20 which extends between the discharge end of entrapment assembly 18 and the inlet end of inserter 14.

Hopper assembly 12 includes a base plate 22 which may be secured to or mounted on any convenient surface. Support brackets 24 and 26 are secured to base plate 22 and extend upwardly therefrom. A drive motor assembly 28 having a drive shaft 30 extending upwardly and laterally therefrom is secured to hopper support 32 which is secured to the upper ends of brackets 24 and 26, as seen in the drawings.

Hopper assembly 12 includes a hopper or hopper basket 34 including a lower end 36 comprising a base 38 and annular flange 40. Base 38 is secured to the hopper support 32 by bolts, screws, etc. Drive shaft 30 rotatably extends through lower end 36, as seen in the drawings. Flange 40 of lower end 36 is provided with an angular discharge slot 42 which communicates with a slot 44 in base 38. Slots 42 and 44 form a discharge opening, as will be described in greater detail hereinafter.

Bar support wheel 46 is mounted on the shaft 30 for rotation therewith and has a plurality of spaced-apart notches 48 formed therein. Positioning wheel 49 is also mounted on shaft 30 for rotation therewith adjacent the upper surface of base 38. The diameter of insert positioning wheel 49 is slightly less than the inside diameter of flange 40 for a purpose to be described hereinafter. Bar support wheel 50 is secured to the upper end of shaft 30 for rotation therewith and also has a plurality of spaced-apart notches 52 formed in the periphery thereof, as seen in the drawings. A plurality of elongated bars 54 are received in the notches 48 and 52 and are secured at least to bar support wheel 50. For purposes of description, the space between adjacent bars 54 will be identified by the reference numeral 56. The lower ends of the bars 54 are partially received by the flange 40 with the lower ends of the bars 54 being spaced from the upper surface of base 38. Bracket 58 is secured to the underside of base 38 and has an arm 60 extending therefrom which has an inner end 62 closely positioned adjacent the exterior surface of the bars 54 adjacent the lower end thereof. Bracket 64 is also secured to the lower surface of base 38 and supports arm 66 thereon having a flexible sheet member 68 secured thereto with the inside surface of the sheet member 68 being closely positioned adjacent the exterior surface of the bars 54 adjacent the lower ends thereof. The inner end 62 of arm 60 and the sheet member 68 have their lower ends slightly spaced from the upper end of flange 40. The inner end 62 and sheet member 68 engage the fasteners protruding through the spaces 56, except for those fasteners which are positioned adjacent the upper edge of flange 40, to cause the fasteners to be deflected inwardly into the hopper basket 34.

Magazine 16 is operatively supported on the bracket 24 and includes a pair of upstanding magazine members 70 and 72 having slots 74 and 76 formed in the inner ends thereof which extend between the upper and lower ends thereof and which are adapted to receive the heads of the fasteners, as will be described hereinafter. The upper ends of the slots 74 and 76 are positioned adjacent flange 40 and base plate 38 so that the slots 74 and 76 communicate with the opposite ends of the slot 44 formed in base plate 38. A fastener sensor 78 in the form of a see-through photoelectric cell of conventional design is secured to magazine member 70 above the lower end thereof.

A fastener sensor 80 in the form of a see-through photocell device is secured to magazine member 70 adjacent the upper end thereof.

The lower ends of slots 74 and 76 communicate with the inlet end of the conventional entrapment assembly 18. The discharge end of the entrapment assembly 18 communicates with the inlet end of the tube 20 so that individual fasteners are supplied, as required, to the inserter 14.

Inserter 14 includes an upper end 84 which serves as a feed tube bracket having a tool hanger 86 pivotally secured thereto for supporting the inserter 14 when the inserter is not being used. Valve body 88 is positioned immediately below upper end 84 and has exhaust manifold block 90 immediately positioned therebelow. Accumulator extension 92 is positioned below exhaust manifold block 90 and has a cylinder sleeve 94 extending downwardly therefrom. The numeral 96 refers to an air accumulation chamber.

The numeral 102 designates a piston rod having a piston 104 provided at its upper end which is slidably received within the interior bore 106 of cylinder sleeve 94 which is positioned in the bore 108 of air accumulation chamber 96. The lower outer end of air accumulation chamber 96 is provided with an arcuate recessed area 110 which partially receives one end of the tube 20, as will be described hereinafter. Piston rod 102 extends through upper spring guide 112, lower spring guide 114, urethane cushion 116, piston rod guide bushing 118, and head 120. Head 120 is secured to the lower end of air accumulation chamber 96 by any conventional means. Head 120 is provided with an internal bore 122 extending therethrough which receives the piston rod guide bushing 118 and the piston rod 102 extending therethrough. Urethane cushion 116 is positioned on top of the piston rod guide bushing 118, as seen in the drawings.

Inserter 14 also includes a handle 123, trigger connecting rod 125, trigger 127 and plunger 129. Handle 123 is secured to chamber 96 by any convenient means.

The lower end of head 120 has an internally threaded bore 124 having a head adapter 126 threadably mounted therein. Head adapter 126 pivotally supports the head fingers 128, 130 and 132 therein. Inasmuch as the head fingers 128, 130 and 132 are identical, only head finger 128 will be described in detail. Head finger 128 includes a lower end 134 having a tapered nose portion 136 extending upwardly therefrom. The upper end of head finger 128 is provided with a groove 138 formed in the exterior surface thereof adapted to receive an O-ring 140 loosely therein. Pivot arm 142 is provided at the upper end of the head finger 128 and is pivotally secured to the head adapter 126. The lower end of head finger 128 is provided with a semi-circular opening 144 formed therein which communicates with a tapered wall surface 146 which terminates in a semi-circular groove or recessed portion 148 which defines a shoulder 150 at the upper end thereof. The upper end of the head finger 128 is provided with a tapered wall surface 152 which terminates in an annular or semi-circular groove or recessed portion 154. When the head fingers 128, 130 and 132 are mounted in the head adapter 126, the O-ring 140 resiliently or yieldably maintains the head fingers 128, 130 and 132 in their closed position, with the O-ring 140 permitting the head fingers 128, 130 and 132 to pivot to an open position to enable the fastener to be supplied thereto and positioned therein, as will be described in greater detail hereinafter.

Figure 18:
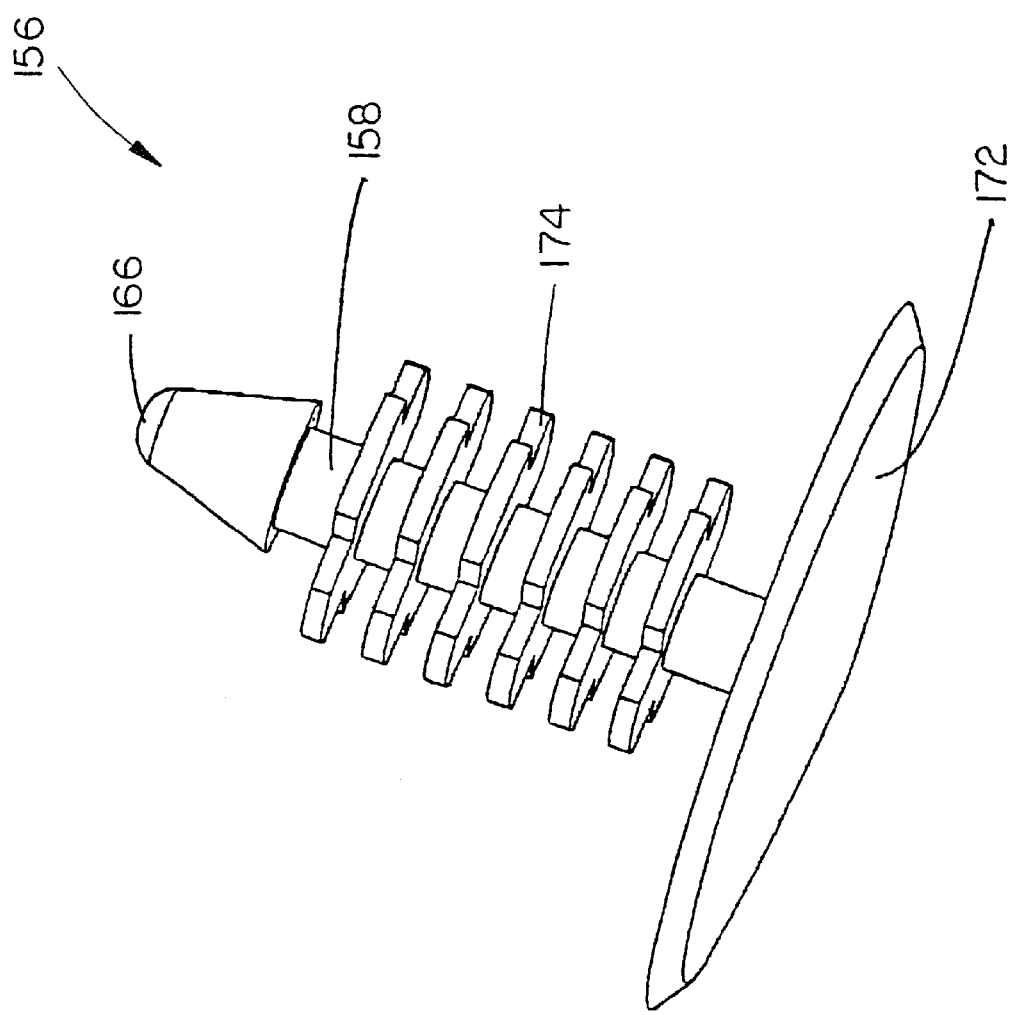
FIG. 18 is a view of a typical type of fastener which will be used with the system of this invention.

FIG. 18 illustrates a typical fastener which may be used with the system of this invention. It should be understood, however, that many different types of fasteners may be used with the system and the fastener 156 is only shown for illustrative purposes.

Fastener 156 includes a shank 158 having a point 160 at one end thereof. At the other end of shank 158 is an enlarged head 172. Shank 158 normally will have some form of retaining means thereon to resist the removal of the fastener once it has been inserted.

In this case, shank 158 includes a plurality of flexible ribs 174. The fastener 156 is sometimes referred to as a "Christmas tree" fastener.

Figure 9:
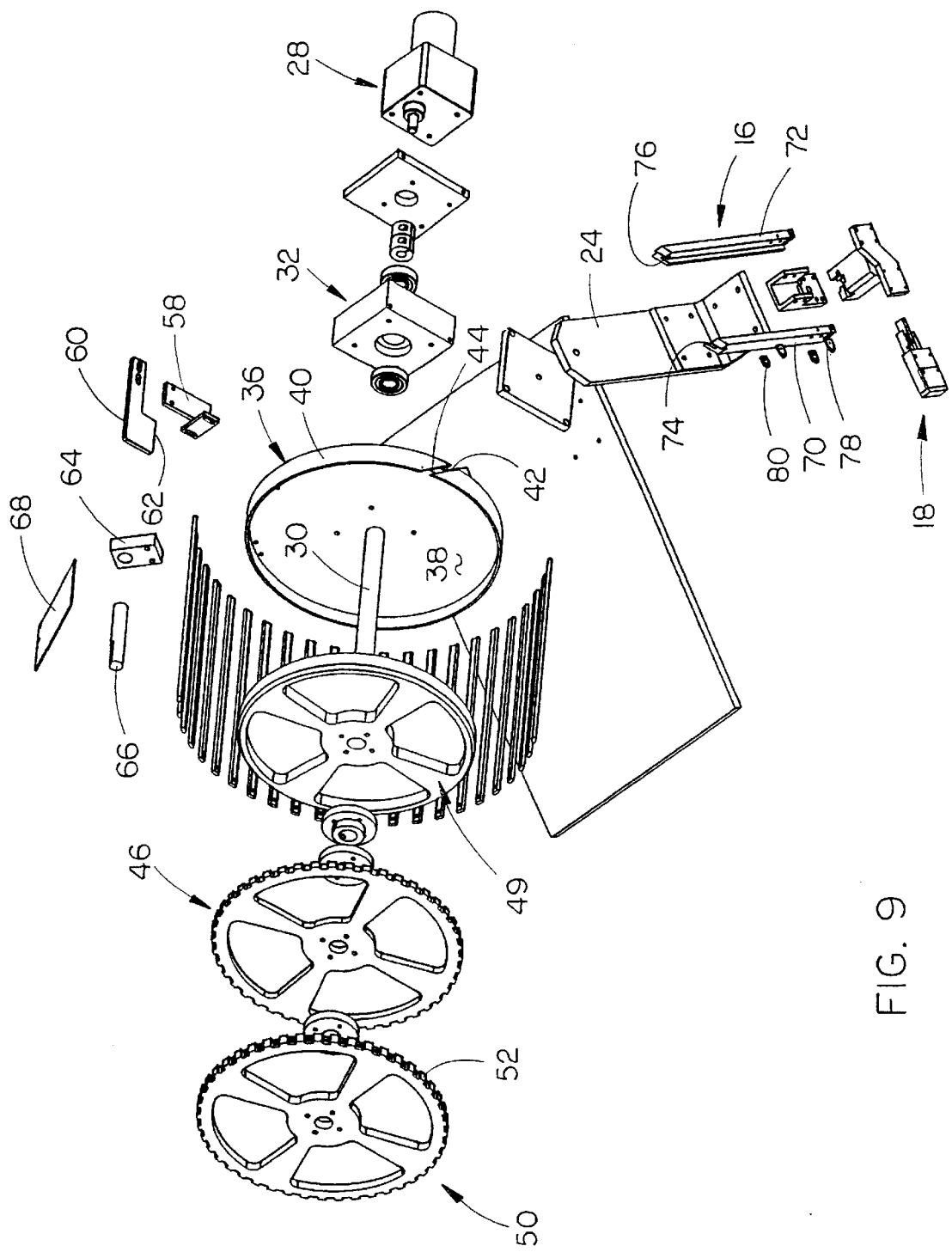
FIG. 9 is an exploded perspective view of the hopper, magazine and entrapment apparatus.
Figure 10:
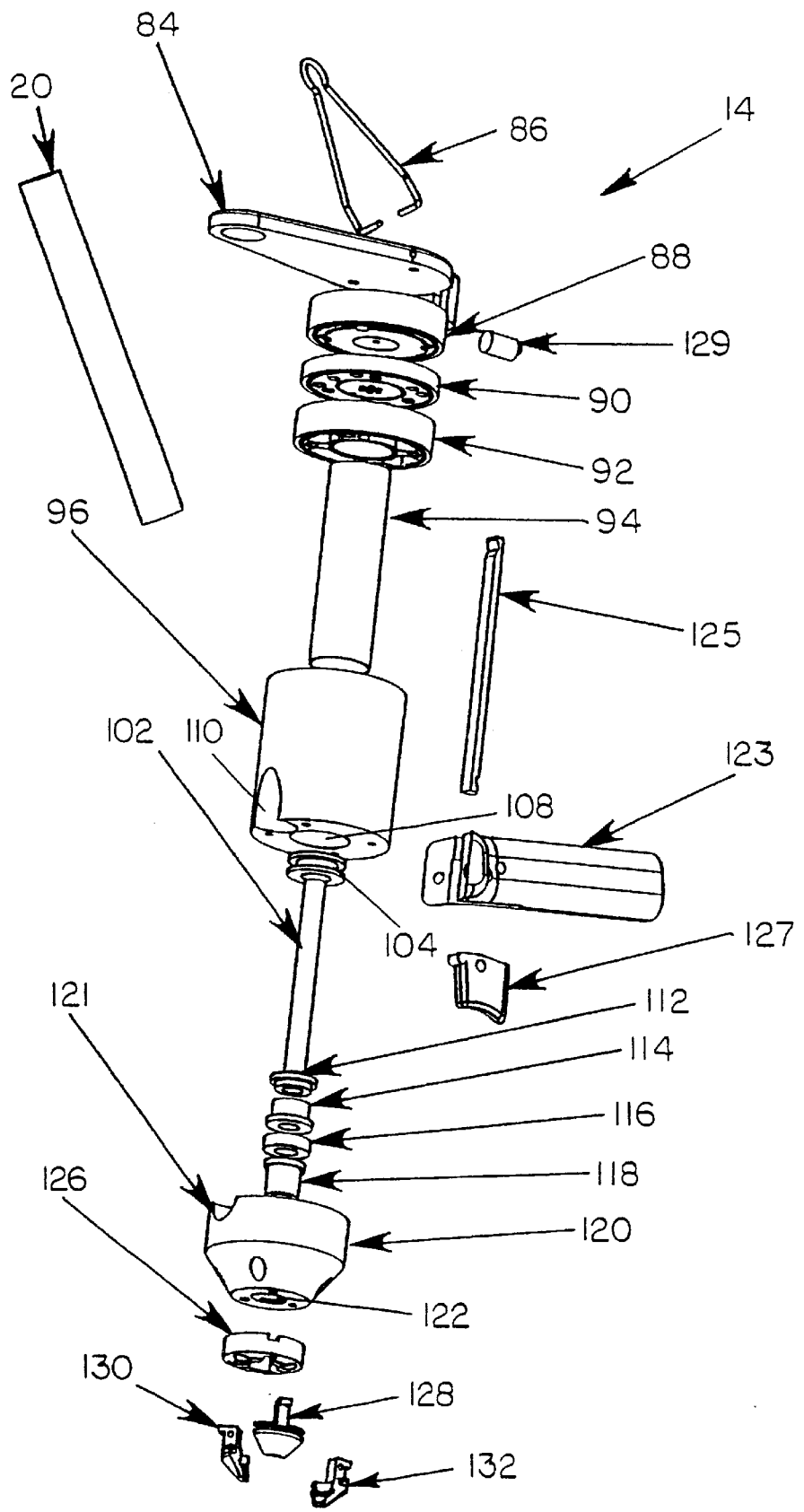
FIG. 10 is an exploded perspective view of the inserter.
Figure 11:
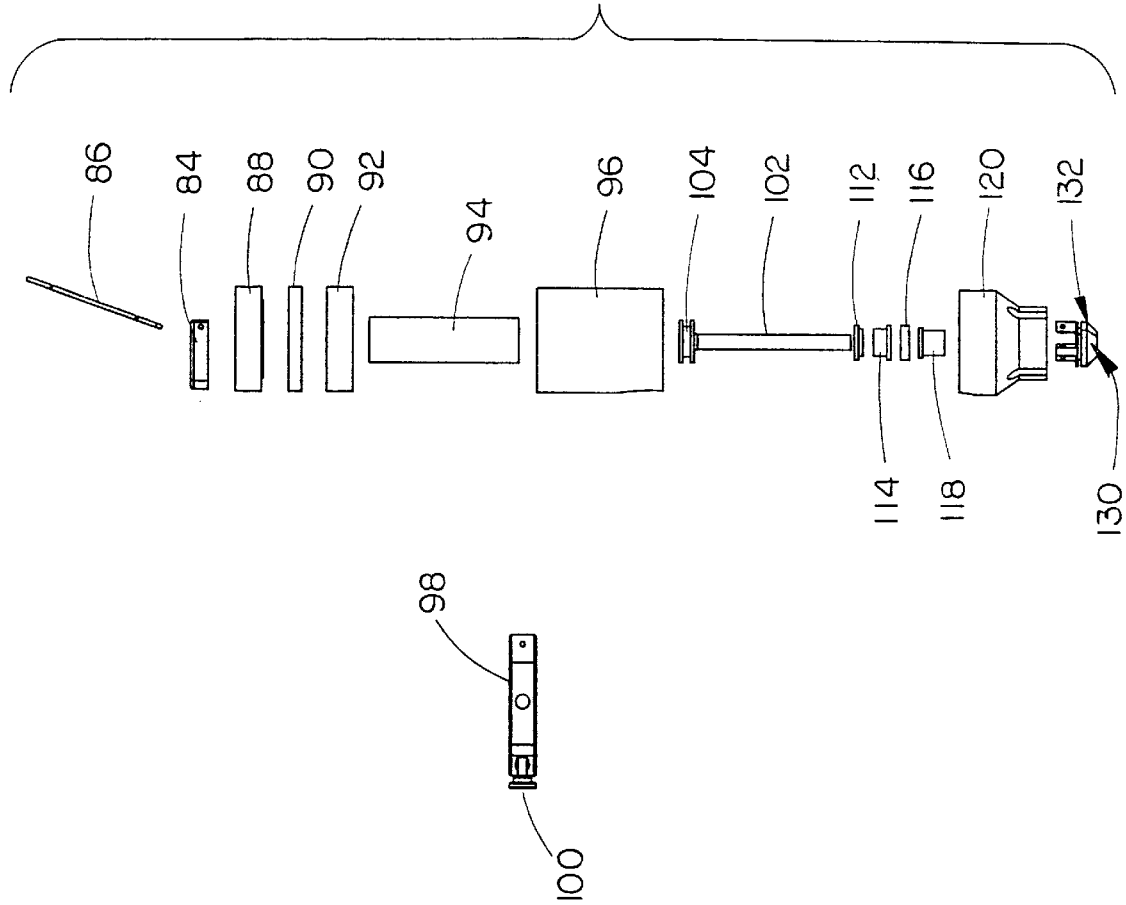
FIG. 11 is side exploded view of the inserter.
Figure 12:
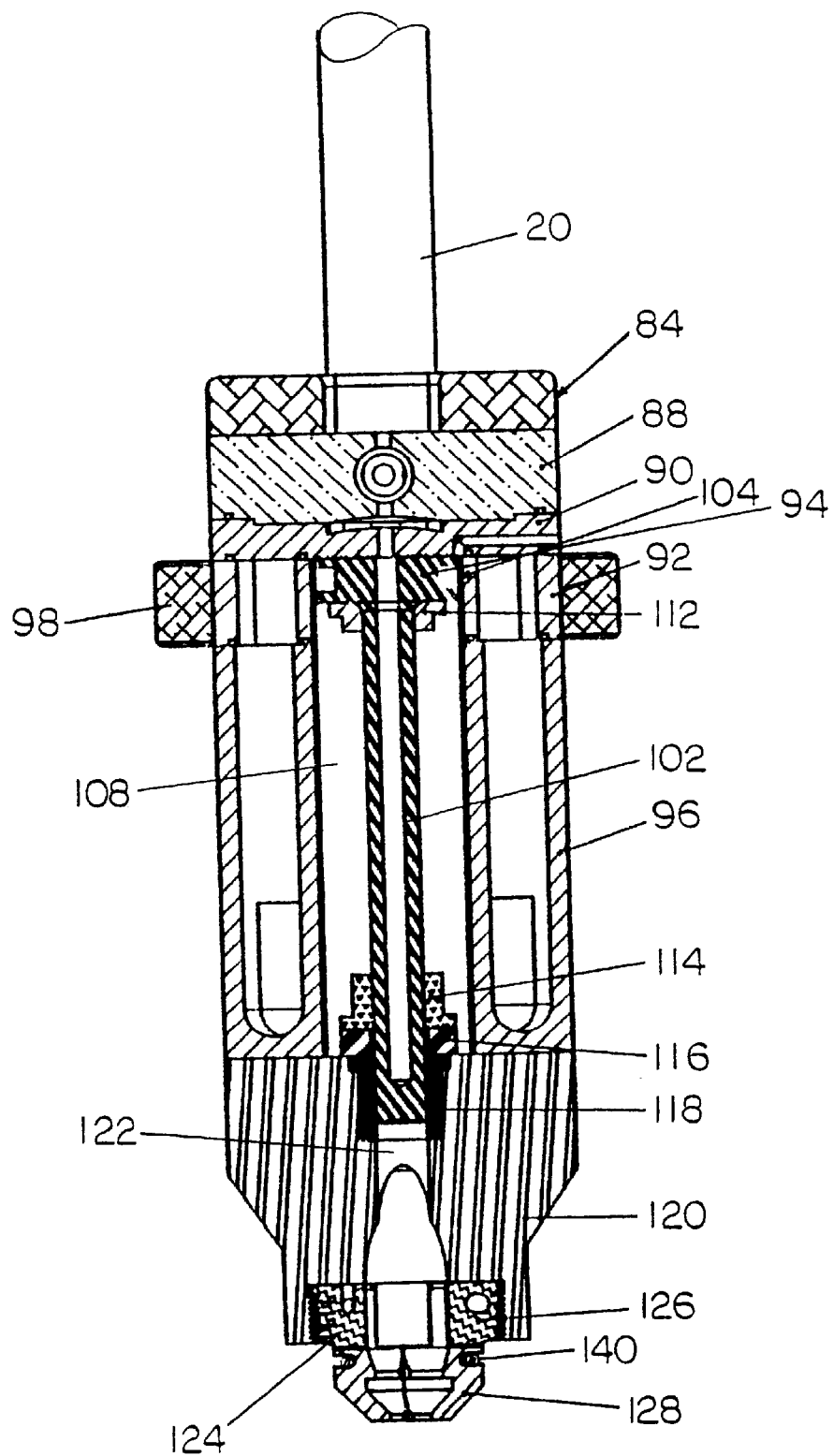
FIG. 12 is a vertical sectional view of the inserter.
Figure 13:
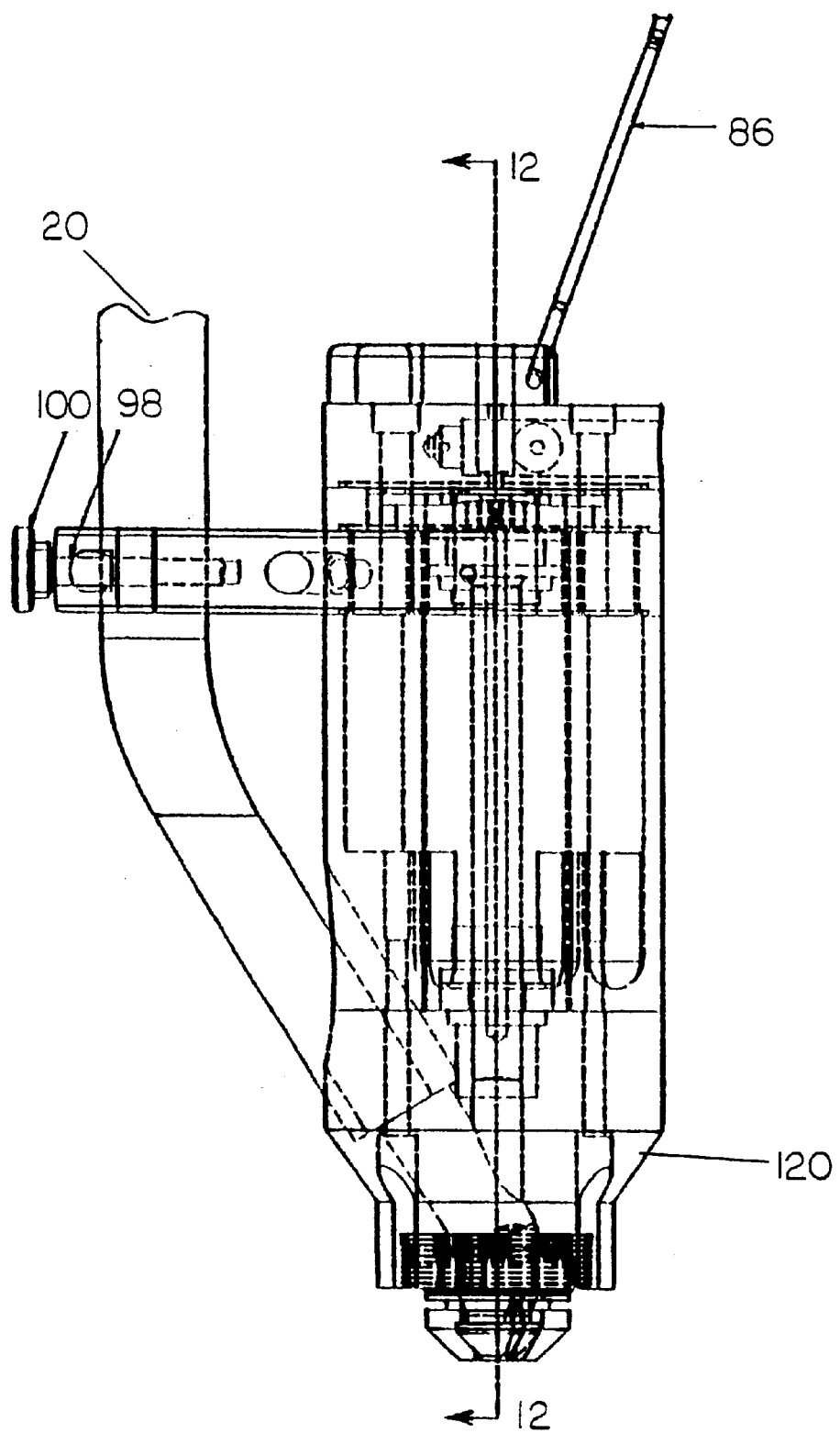
FIG. 13 is a side elevational view of the inserter.
Figure 14:
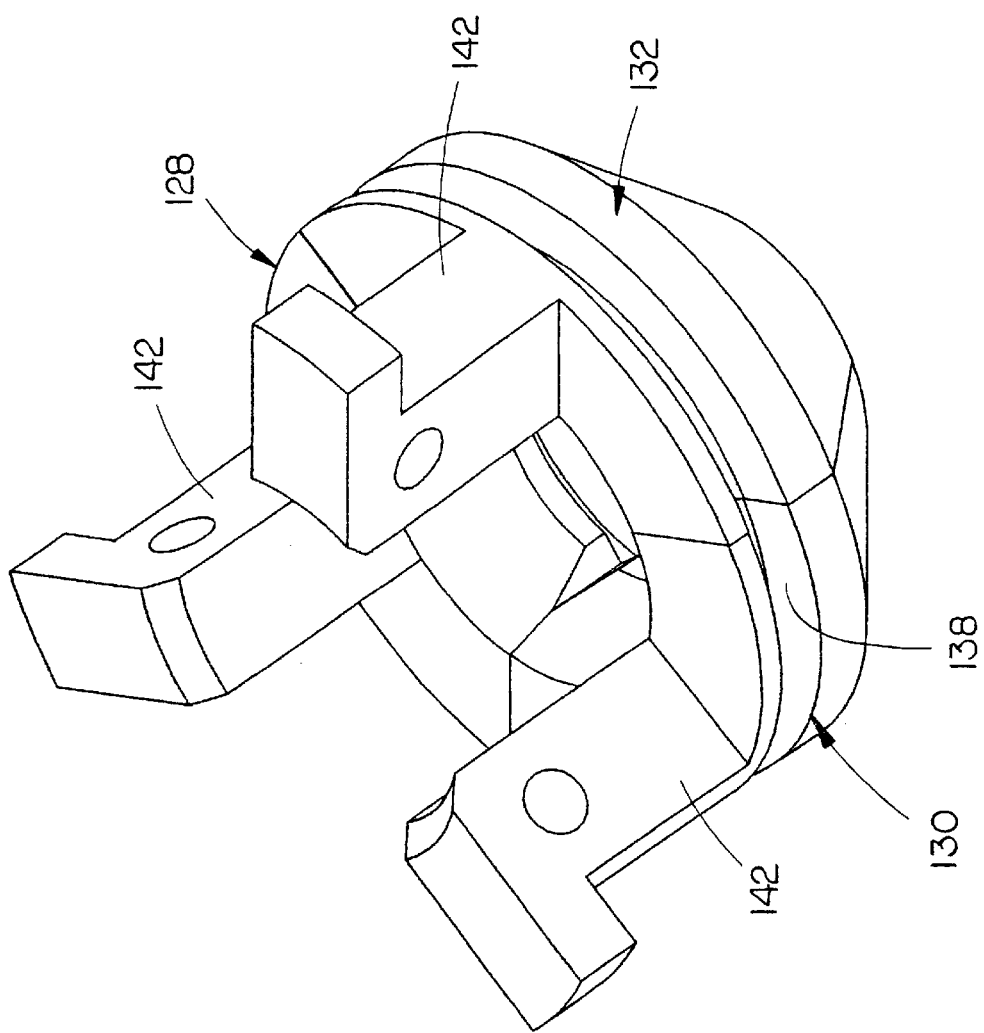
FIG. 14 is a perspective view of the first, second and third head fingers.
Figure 15:
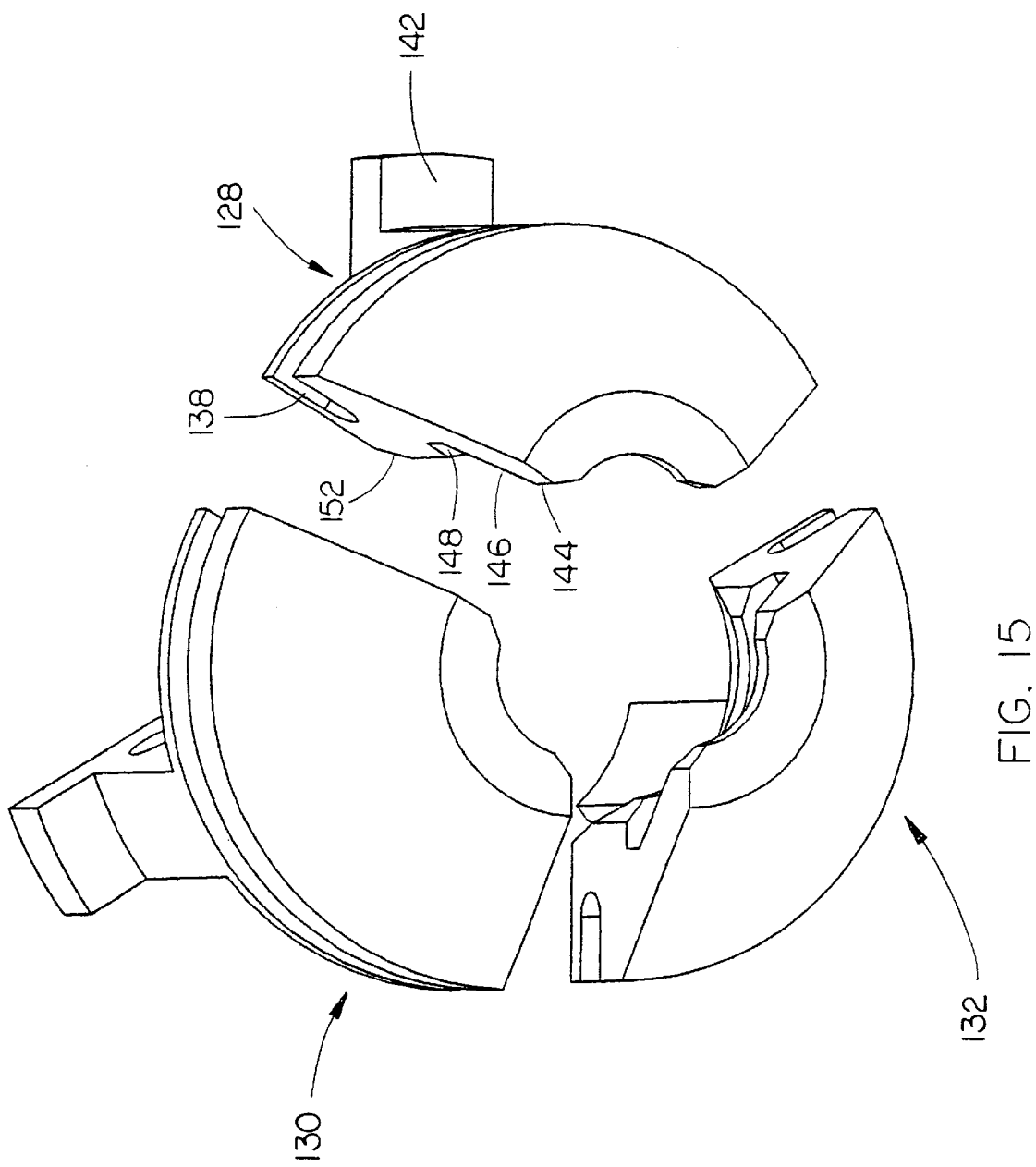
FIG. 15 is also a perspective view of the head fingers, but which illustrates the head fingers slightly separated.
Figure 16:
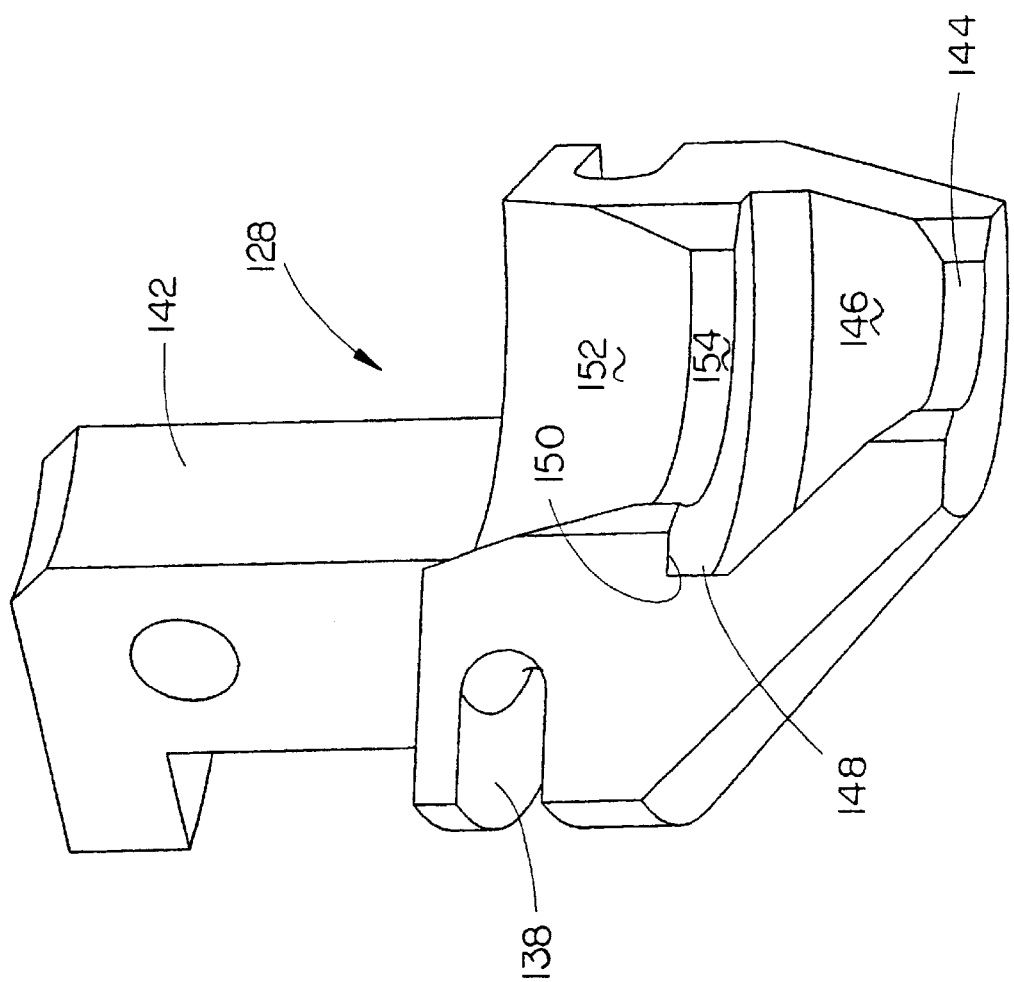
FIG. 16 is a perspective view of one of the head fingers.
Figure 17:
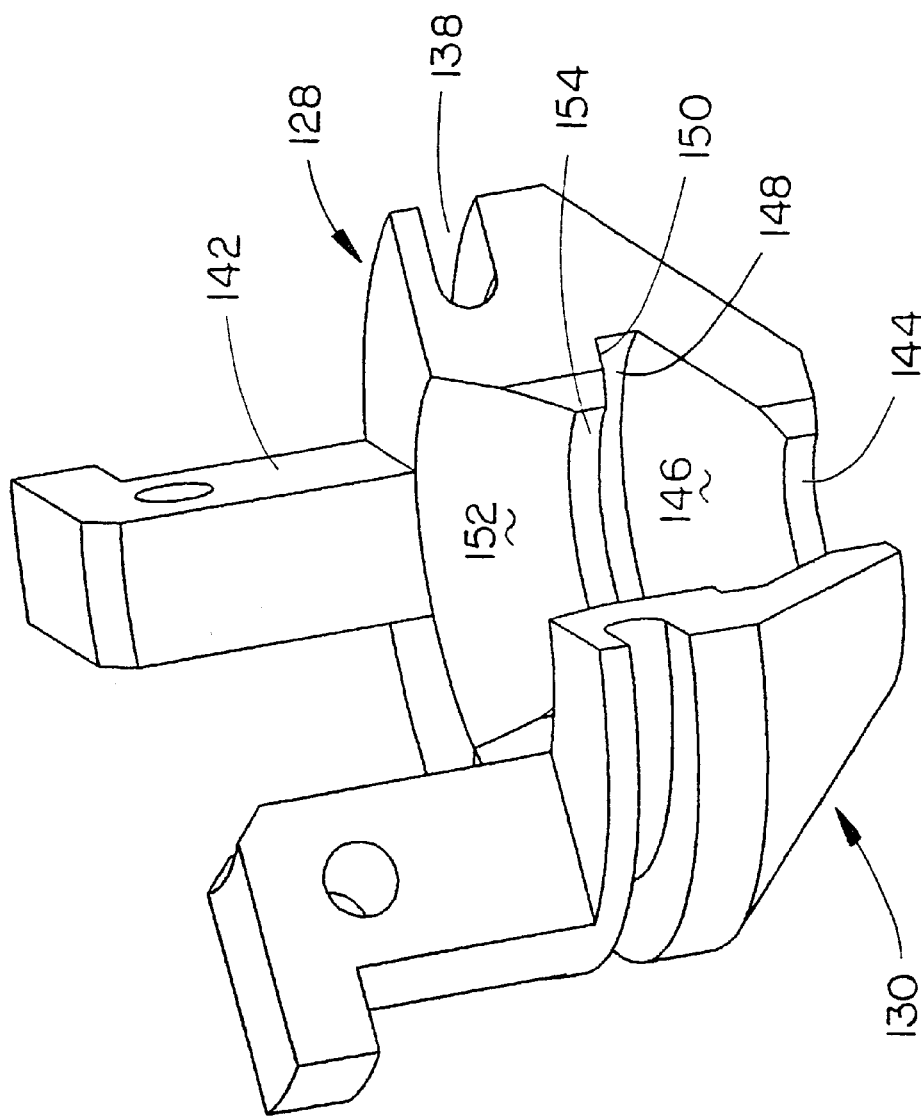
FIG. 17 is a perspective view of the head fingers with one of the head fingers removed to more fully illustrate the invention.

In operation, a plurality of the fasteners 156 are placed into the hopper through 1 5 one of the openings in wheel 50. The fasteners 156 are placed into the hopper in a random, bulk fashion. The drive motor assembly 28 is then activated to cause the shaft 30, wheels 46, 49 and 50, together with the bars 54 positioned on wheels 46 and 50, to be rotated in a clockwise direction, as viewed in FIG. 9. As the bars 54 are being rotated, the fasteners 156 tumble with the shanks 158 of many of the fasteners 156 protruding outwardly through the spaces 56 between the bars 54. Such protrusion generally occurs when the bars 54 are in the four o'clock to eight o'clock position relative to base plate 38. Once the shank 158 of a fastener 156 has been extended outwardly through a space 56, continued rotation of the bars 54 causes the fastener so positioned to gradually work downwardly on the bars 54, as the hopper is rotated, until the shank 158 comes into contact with the upper edge of the flange 40 with a portion of head 172 of the fastener 156 being positioned between the outer periphery of wheel 49 and the inner surface of flange 40 and a portion of the head 172 being positioned between the outer periphery of wheel 49 and the inside surface of a pair of bars 54 which prevents the fastener 156 from falling inwardly from its supporting bars as the same rotates the fastener from the nine o'clock position to the three o'clock position.

When the fastener 156 so positioned has come into communication with the discharge slots 42 and 44, the head 172 of the fastener 156 and the shank 158 of the fastener 156 will move downwardly through the discharge slots 44 and 42, respectively. The inner end 62 of the arm 60 and the flexible sheet member 68 engage protruding portions of fasteners, except for those fasteners which are positioned at the outer end of flange 40, to cause the fasteners not properly positioned to fall back into the basket.

As the fastener 156 is discharged from the hopper by way of the slots 42 and 44, the outer edges of the head 172 will be received by the slots 74 and 76 in the magazine members 70 and 72, respectively. It should be noted that the hopper is only rotated when the sensor 78 senses that the level of the fasteners 156 stacked in the magazine members 70 and 72 has fallen below the sensor 78. The hopper is continued to be rotated until the sensor 80 senses that the stack of fasteners in the magazine has reached the level of the sensor 80.

The entrapment means 82 is conventional in fashion and is controlled so as to deliver one fastener 156 at a time to the tube 20 as demanded by the inserter 14. Assuming that the inserter 14 has just been activated and it is necessary to provide another fastener to the inserter 14, the entrapment apparatus 82 supplies a fastener to the inlet end of the tube 20 with pressurized air forcing the fastener, point first, down the length of the tube 20 to the inserter 14. The discharge end of the tube 20 is received by the recessed areas 110 and 121 and is held in position by the tube bracket 98. Pressurized air delivers individual fasteners 156 to the head fingers 128, 130 and 132. The air pressure in the tube 20 causes the periphery of the head 172 of the fastener 156 to come into contact with the tapered surfaces 152 on each of the fingers 128, 130 and 132 which causes the fingers to pivot outwardly against the resiliency of the O-ring 140 until the periphery of the head 172 is received in the groove 148 in each of the head fingers 128, 130 and 132. As the fingers 128, 130 and 132 open to permit the head 172 to be positioned in the groove 148, the air behind the fastener is exhausted through the fingers which causes the fingers 128, 130 and 132 to move towards one another through the action of the O-ring 140 so that the fastener 156 is positioned in the fingers 128, 130 and 132 for subsequent insertion. When the fastener is so positioned, the pointed shank 158 will protrude from the outer ends of the head fingers 128, 130 and 132.

When it is desired to insert a fastener 156 into or through the material being secured, the point of the fastener is properly positioned and the inserter is actuated in conventional fashion which causes the air in the air accumulation chamber 96 to drive the piston rod 102 outwardly or downwardly so that the piston rod 102 strikes the head 172 of the fastener 156 to drive the fastener 156 outwardly with respect to the head fingers 128, 130 and 132 which is permitted by the pivotal movement thereof against the resiliency of the O-ring 140. The force of the piston rod 102 striking the head 172 of the fastener 156 drives the fastener into the material and through the material being secured.

It should be noted that the feed hopper of this invention, while being ideally suited for use with the particular inserter 14 described herein, may be adapted for use with other types of inserters. It should also be noted that although the inserter 14 of this invention is ideally suited for use with a feed hopper such as described herein, other types of feed hoppers will function satisfactorily with the inserter of this invention. For example, the fasteners could be supplied to the head fingers by a magazine, strip, etc.

The pivotal head fingers are an extremely important aspect of the inserter. The pivotal movement of the head fingers enables the head fingers to pivot open so that a fastener may be properly be positioned therebetween. The head fingers, by way of their pivotal action, also permit the fasteners to be driven outwardly therefrom by the piston rod. The fact that the head fingers are removably secured to the head adapter enables different sizes and shapes of the fingers to be utilized to accommodate various types of fasteners.

Thus can be seen that the invention accomplishes at least all of its stated objectives.

We claim:

1. A feed hopper for supplying fasteners, of the type including a shank and an enlarged head, to a fastener inserter, comprising:
   a lower end member including a disc-shaped base plate and a peripheral flange extending therefrom;
   said lower end member having a discharge opening formed therein to permit fasteners to be discharged therethrough;
   a rotatable drive shaft extending upwardly and outwardly from said base plate and having upper and lower ends;
   a ring-shaped bar support means positioned on said drive shaft for rotation therewith;
   a plurality of spaced-apart elongated bars mounted on said bar support means for movement therewith;
   said bars having upper and lower ends;
   the lower ends of said bars being positioned adjacent said flange on said lower end member;
   said bars defining a hopper compartment into which the fasteners may be supplied in bulk form;
   means for rotating said drive shaft, said bar support means and said bars;
   the rotation of said bar support means and said bars causing at least some of the fasteners in said hopper compartment to be oriented so that the shanks thereof protrude outwardly from said hopper compartment between said bars and so that said same fasteners will travel to a position adjacent said lower end member.

2. The feed hopper of claim 1 wherein said discharge opening in said lower end member comprises a first slot formed in said base plate and a second slot in said flange which communicates with said first slot.

3. The feed hopper of claim 1 wherein a fastener magazine is positioned adjacent said discharge opening for receiving the fasteners being discharged from said hopper compartment.

4. The feed hopper of claim 3 wherein a fastener entrapment apparatus is in operative communication with said fastener magazine for receiving fasteners from said fastener magazine and for supplying the fasteners, as required, to the fastener inserter.

5. The feed hopper of claim 4 wherein a flexible supply tube extends from said fastener entrapment apparatus to the fastener inserter.

6. The feed hopper of claim 5 wherein the fastener inserter includes a housing having a fastener intake opening which is in communication with said supply tube and wherein said housing includes a head having a plurality of head fingers pivotally mounted thereon for receiving the fastener to be inserted and for positioning the same in a ready position.

7. The feed hopper of claim 6 wherein a movable piston is provided in said housing which is adapted to selectively strike the fastener in the said ready position to force the said fastener from said head fingers into the material to be secured.

8. The feed hopper of claim 7 wherein said head fingers resiliently hold the said fastener in its ready position.

9. The feed hopper of claim 8 wherein said head fingers are pivotally mounted on a head adapter which is selectively secured to said head of said housing.

10. The feed hopper of claim 1 wherein a fastener positioning wheel is mounted on said drive shaft for rotation therewith adjacent said base plate inwardly of said flange.

11. The feed hopper of claim 10 wherein said fastener positioning wheel has a diameter less than said flange.

12. The feed hopper of claim 11 wherein the lower ends of said bars are spaced from said base plate to enable the oriented fasteners having shanks protruding outwardly from said hopper compartment between said bars to pass from said bars into said discharge opening.

13. The feed hopper of claim 1 wherein said bars are flat.

* * * * *